US012643565B2

(12) United States Patent
Schindler et al.

(10) Patent No.: US 12,643,565 B2
(45) Date of Patent: Jun. 2, 2026

(54) METHOD FOR PROVIDING INFORMATION ON THE RELIABILITY OF A PARAMETRIC ESTIMATION OF A PARAMETER FOR THE OPERATION OF A VEHICLE

(71) Applicant: Robert Bosch GmbH, Stuttgart (DE)

(72) Inventors: Lena Schindler, Schwieberdingen (DE); Marco Limberger, Appenweier-Urloffen (DE); Elena Sgarz, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 18/044,828

(22) PCT Filed: Sep. 20, 2021

(86) PCT No.: PCT/EP2021/075748
§ 371 (c)(1),
(2) Date: Mar. 10, 2023

(87) PCT Pub. No.: WO2022/063713
PCT Pub. Date: Mar. 31, 2022

(65) Prior Publication Data
US 2023/0382421 A1 Nov. 30, 2023

(30) Foreign Application Priority Data
Sep. 24, 2020 (DE) ..................... 10 2020 212 042.0

(51) Int. Cl.
*B60W 60/00* (2020.01)
(52) U.S. Cl.
CPC ....... *B60W 60/001* (2020.02); *B60W 2530/00* (2013.01)

(58) Field of Classification Search
CPC ........... B60W 60/001; B60W 2530/00; B60W 50/045; B60W 2556/20; B60W 60/00;
(Continued)

(56) References Cited

U.S. PATENT DOCUMENTS

| | | | | |
|---|---|---|---|---|
| 10,809,388 | B1 * | 10/2020 | Carcanague | ............ G01S 19/49 |
| 2018/0306930 | A1 * | 10/2018 | Laine | ................. G01C 21/1656 |
| 2021/0116579 | A1 * | 4/2021 | Rezaei | .................... G01S 19/25 |

FOREIGN PATENT DOCUMENTS

| | | |
|---|---|---|
| DE | 10 2014 111 127 A1 | 2/2016 |
| DE | 10 2018 117 830 A1 | 1/2020 |

(Continued)

OTHER PUBLICATIONS

International Search Report corresponding to PCT Application No. PCT/EP2021/075748, mailed Dec. 10, 2021 (German and English language document) (6 pages).

*Primary Examiner* — Aniss Chad
*Assistant Examiner* — Christine Nguyen Huynh
(74) *Attorney, Agent, or Firm* — Maginot, Moore & Beck LLP

(57) ABSTRACT

The disclosure relates to a method for providing information on the reliability of a parametric estimation of a parameter for the operation of a vehicle, comprising at least the following steps:

a) identifying an integrity range for the parametric estimation, the integrity range describing the range in which an estimated parameter is located with a minimum probability, b) identifying a validity indicator which describes the validity of the integrity range identified in step a), c) providing the integrity range identified in step a) and the validity indicator identified in step b).

9 Claims, 2 Drawing Sheets

(58) Field of Classification Search
CPC ......... G01C 21/28; G01C 25/00; G01S 7/497;
G01S 7/52004; G01S 15/931; G01S
17/06; G01D 3/08
See application file for complete search history.

(56) References Cited

FOREIGN PATENT DOCUMENTS

| DE | 10 2018 222 166 A1 | 6/2020 |
| DE | 10 2018 222 663 A1 | 6/2020 |
| DE | 10 2019 200 423 A1 | 7/2020 |
| JP | 2019-28028 A | 2/2019 |
| JP | 2019-174191 A | 10/2019 |

* cited by examiner

METHOD FOR PROVIDING INFORMATION ON THE RELIABILITY OF A PARAMETRIC ESTIMATION OF A PARAMETER FOR THE OPERATION OF A VEHICLE

This application is a 35 U.S.C. § 371 National Stage Application of PCT/EP2021/075748, filed on Sep. 20, 2021, which claims the benefit of priority to Serial No. DE 10 2020 212 042.0, filed on Sep. 24, 2020 in Germany, the disclosures of which are incorporated herein by reference in their entirety.

The disclosure relates to a method for providing information on the reliability of a parametric estimation of a parameter for the operation of a vehicle, to a computer program for performing the method, to a machine-readable storage medium, and to a controller for a vehicle. The disclosure is in particular suitable for being used in connection with autonomous driving.

BACKGROUND

One of the most important challenges for autonomous driving is determining the self-position of the autonomous vehicle as accurately and reliably as possible. The autonomous vehicle generally has sensors, such as inertial sensors, wheel sensors, environmental sensors, GNSS sensors, optical and/or acoustic sensors, by means of which the vehicle can estimate its self-position. In this context, it is helpful if information on the (expected) estimation accuracy of an identified self-position is also output. In this context, the confidence of the identified self-position can be represented by a so-called "protection level" (in short: "PL"), for example. The PL can describe a statistical error limit, the calculation of which is generally based on statistical considerations and, where appropriate, additionally on a suitable coordination of the estimation algorithms.

The concept of providing the protection level is in particular common in aerospace. However, the solutions developed in this respect are not easily transferred to the field of application of autonomous driving. In particular, street canyons and their influence on satellite signals, for example, constitute problems that do not occur in aerospace applications. There is therefore a need for improved methods for calculating as reliable a protection level as possible, which methods can provide reliable results, in particular also in difficult environments, such as in urban areas.

SUMMARY

Described herein is a method according to claim 1 for providing information on the reliability of a parametric estimation of a parameter for the operation of a (motor) vehicle, comprising at least the following steps:

a) identifying an integrity range for the parametric estimation, the integrity range describing the range in which an estimated parameter is located with a minimum probability, b) identifying a validity indicator which describes the validity of the integrity range identified in step a), c) providing the integrity range identified in step a) and the validity indicator identified in step b).

In order to perform the method, steps a) to c) may be performed at least once or multiple times one after the other in the sequence given. Moreover, steps a) and b) may be performed at least in part in parallel or even simultaneously.

The parameter may be a safety-relevant parameter and/or a parameter relevant to or required for an at least partially automated and/or autonomous driving operation. The parameter may provide information relevant to the driving operation of the vehicle and/or may help or be suitable to describe the driving operation of the vehicle. One or more (different) parameters may in principle be estimated. The parameter may, for example, be a self-position, self-speed, self-acceleration, or the like. Preferably, the parameter relates to the self-position of the vehicle.

The parameter may be a driving operating parameter of the (motor) vehicle. The term "driving operating parameter" is in particular understood herein to mean a parameter that helps to describe the spatial driving operation of a vehicle or the operation of a vehicle in space. In particular, the driving operating parameter at least helps to describe self-movement and/or self-position of a vehicle. The driving operating parameter may, for example, be a (self-)position, a (self-)speed, (self-)acceleration, or a location (or orientation) of the vehicle. Preferably, the driving operating parameter is a self-position of the vehicle. The method may (thus), for example, be used in connection with a position estimation of a vehicle position. In this respect, the integrity range may describe the range in which an estimated self-position of a vehicle is (actually) located with a minimum probability.

The information to be provided on the reliability of the parametric estimation may, for example, comprise at least two pieces of information. The information preferably comprises at least one integrity range for the parametric estimation, as well as a validity indicator. Providing at least these two pieces of information may advantageously help to improve the reliability of determining a self-position of a vehicle (which can in particular be driven in an at least partially automated or autonomous manner). A further advantage of the method can be seen in that the validity information in the form of the validity indicator is provided in addition to the integrity information in the form of the integrity range. This allows the possibility of enriching the information provided by the integrity range, without having to change the integrity range itself. As a result, the design of the determination of the integrity range for use in different contexts can advantageously remain unchanged or remain independent of the validity information in the form of the validity indicator. The integrity range can thus furthermore be output as mathematically defined statistical error information or error limit. This provides advantageous usability, in particular from the point of view of unified interfaces, since the original meaning/definition of the integrity range does not have to be changed. The possibility of a modular design can thereby also be improved. In addition, the provided integrity range can, where appropriate, thus also be used independently of the validity indicator, whereby the application possibility thereof can advantageously be increased.

In step a), an integrity range for the parametric estimation is identified, the integrity range describing the range in which an estimated parameter (value) is (actually) located with a minimum probability. The estimated parameter (value) in principle describes an (individual, in particular instantaneous) estimation result of the parametric estimation. In other words, this means in particular that the integrity range describes the range in which a real or actual value of an estimated parameter is located with a minimum probability. Such an integrity range may also be referred to as the so-called "protection level."

The minimum probability is generally a predefined minimum probability. Preferably, the minimum probability is 90%, more preferably 95%, or even 99%.

Preferably, the integrity range is a protection level. The protection level generally describes the (spatial, in particular two- or three-dimensional) range in which an estimated parameter (value) is (actually) located with a minimum probability. The estimated parameter (value) in principle describes an (individual, in particular instantaneous) estimation result of the parametric estimation. In other words, this means in particular that the protection level describes the range in which a real or actual value of an estimated parameter is located with a minimum probability.

In yet other words, a protection level, in particular, describes a confidence interval or a (spatial) confidence range in which the true value of an estimated parameter is located with a minimum probability. The estimated value of the parameter is usually in the middle or the center of the confidence interval or confidence range.

The minimum probability with which a real or actual value of an estimated parameter is actually located in a protection level is still much higher than in "usual" integrity ranges. The minimum probability here is typically over 99.99%, particularly preferably over 99.999%, or even over 99.9999%. For the protection level, the minimum probability may also be expressed not in percent but in possible errors during a particular time interval. A protection level may, for example, be defined such that the parameter in question is outside the protection level only once in 10 years. The protection level may, for example, be expressed either as a unitless probability or as a rate, i.e., as a probability of errors occurring over a time interval.

The parameter estimation may generally comprise one or more methods for estimating a (the same) parameter. Preferably, at least one method for estimating the parameter is used, which may moreover also provide and/or determine integrity information on the integrity of the estimation, or confidence information on the confidence of the estimation result. For example, parameter estimation may take place by means of a Kalman filter. In addition to the (actual) estimation result, the latter usually also provides confidence information (e.g., covariance matrix) on the parameter estimation, which can be used to identify the integrity range here.

In step b), a validity indicator is identified which describes the validity of the integrity range identified in step a). The validity indicator may be binary (valid/not valid) or comprise various "digital intermediate statuses." The possible "intermediate statuses" could indicate, for example, that a particular integrity risk number is currently applicable (e.g., le-3 in urban scenarios and le-5 on highways). The validity indicator may furthermore comprise, by way of example, a (numerical) value describing the validity or reliability of the identified integrity range. Identifying may, for example, comprise combining various pieces of (input) information, in particular various pieces of sensor information and/or status information (e.g., on safety-related systems of the vehicle and/or from diagnostic devices of the vehicle). For example, the non-availability of at least one piece of (input) information may also influence (in particular, negatively influence) the validity indicator.

The validity indicator can be used, for example, as a function of, in particular, vehicle-side conditions or information and/or conditions or information external to the vehicle and/or information on the integrity range. Vehicle-side conditions and/or conditions external to the vehicle may, for example, help in that the identified integrity range can be trusted more or less. The vehicle-side conditions or information may, for example, be on particular travel situations, such as longitudinal and/or lateral accelerations outside defined limits, and/or on particular (safety-relevant)

vehicle statuses and/or system statuses of vehicle systems, such as at least in part system failures and/or sensor failures. The conditions or information external to the vehicle may, for example, be on environmental factors, such as weather conditions and/or sensor shading. Corresponding conditions or information may, for example, be associated with (numerical) values that may enter into the identification of the validity indicator if the corresponding condition is present. If a plurality of the conditions or pieces of information are present, they may, for example, be multiplied and/or added or logically linked together in order to calculate the validity indicator.

In step c), the integrity range identified in step a) and the validity indicator identified in step b) are provided. In the process, the identified integrity range and the identified may preferably be provided together. In this context, these two pieces of information may, for example, be provided in the form of a pair of values. These pieces of information may, for example, be provided to a system of the vehicle configured to self-localize the vehicle. An example of such a system may be a movement and position sensor of the vehicle and/or a controller for at least partially automated or autonomous driving of the vehicle. This system may, for example, decide as a function of the identified integrity range and/or of the identified validity indicator, whether and in particular, where appropriate, with what weighting it uses the associated parametric estimation for position determination.

According to one advantageous embodiment, it is proposed that the identification of the integrity range according to step a) and/or the identification of the validity indicator according to step b) take place based on sensor data of at least one sensor of the vehicle. The at least one sensor may, for example, comprise a GNSS sensor, which may usually receive GNSS (Global Navigation Satellite System) data (such as GNSS correction data and/or GNSS position data) and, where appropriate, provide them (pre)processed. The at least one sensor may alternatively or additionally comprise at least one surroundings sensor. The at least one surroundings sensor may, for example, be a camera, a RADAR sensor, a LIDAR sensor, and/or an ultrasonic sensor. Moreover, further (or alternative) sensor data and/or input data may also be considered in the identification of the integrity range according to step a) and/or in the identification of the validity indicator according to step b), such as sensor data on vehicle parameters (e.g., speed, acceleration, steering angle, etc.) and/or input data describing a vehicle status, for example as to whether additional components are connected to the vehicle, such as a trailer, a bicycle carrier, or the like.

According to a further advantageous embodiment, it is proposed that the integrity range in step a) is identified based on statistical confidence information on the parametric estimation. The statistical confidence information may, for example, be a variance and/or a residual of the parametric estimation. Moreover, the confidence information may also (alternatively) be information identified as a function of a variance and/or of a residual and/or of a (different) indicator of the trustworthiness of the estimation. Residuals, variances, covariances, or the like in particular come into consideration as confidence information. For example, the confidence information may be provided in the form of or from a covariance matrix.

In this context, the integrity range may in particular be a confidence interval, for example. A confidence interval (also referred to as a confidence range and an expectancy range) is an interval from statistics that is to specify the precision of the position estimation of a parameter (e.g., a mean value). The confidence interval specifies the range that includes the true position of the parameter with a certain probability (the confidence level) in an infinite repeat of a random experiment.

According to a further advantageous embodiment, it is proposed that the validity indicator is identified using at least one piece of environmental information on the environment of the vehicle. The environmental information may in particular be provided in the form of data from a surroundings sensor of the vehicle. The surroundings sensor may, for example, be a camera, a RADAR sensor, a LIDAR sensor, and/or an ultrasonic sensor.

According to a further advantageous embodiment, it is proposed that the validity indicator is identified using at least one piece of status information on the status of the vehicle or of a component thereof. The status information may, for example, comprise information on the presence of particular driving situations, such as longitudinal and/or lateral accelerations, in particular outside defined limits. The status information may, for example, comprise information on the presence of particular (safety-relevant) vehicle statuses and/or system statuses of vehicle systems, such as at least in part system failures and/or sensor failures.

According to a further advantageous embodiment, it is proposed that the validity indicator is identified using the integrity range identified in step a). The integrity range may thus, for example, also influence the validity indicator.

According to a further advantageous embodiment, it is proposed that the validity indicator is provided as a value from a predetermined quantity of values. Thus, for example, particular validity levels can be specified and it can be identified which of the validity levels are present at the moment or in the associated integrity range. The quantity of values may, for example, be two so that the validity indicator is binary.

According to a further aspect, a computer program for performing a method described herein is also proposed. In other words, this, in particular, relates to a computer program (product) comprising instructions that, when the program is executed by a computer, cause the computer to execute a method described herein.

According to a further aspect, a machine-readable storage medium is also proposed, in which the computer program described herein is stored. The machine-readable storage medium is routinely a computer-readable data carrier.

According to a further aspect, a controller for a (motor) vehicle is also proposed, wherein the controller is configured to perform a method described herein. The controller may, for example, be a device (or a computer) for the self-localization of the vehicle.

The controller may, for example, comprise an integrity module for identifying the integrity range and a validity module for identifying the validity indicator. The modules can in principle be implemented as physical components of the controller or as parts of a computer program. The integrity module may, by way of example, be configured to identify the integrity range as a function of at least one piece of confidence information. The confidence information may, for example, result from a Kalman filter estimation. The validity module may, by way of example, be configured to identify the validity indicator as a function of in particular vehicle-side conditions or information and/or conditions or information external to the vehicle and/or the integrity range. For this purpose, the validity module may, by way of example, comprise a combiner with which various pieces of information, such as vehicle-side conditions or information and/or conditions or information external to the vehicle and/or information on the integrity range, may be combined to form the validity indicator or may be (pre)processed and the processed information may subsequently be combined to form the validity indicator. For example, the various pieces of information may, for example, comprise sensor data, at least one piece of environmental information and/or at least one piece of status information and/or at least one piece of information about the integrity range.

Moreover, a motor vehicle can also be specified, which comprises a controller described herein. The motor vehicle is in principle an automobile, preferably an automobile that is operated in an at least partially automated and/or autonomous manner, in particular an autonomous automobile.

The details, features and advantageous embodiments discussed in connection with the method may also occur analogously in the computer program presented herein, the storage medium, the controller and/or the vehicle, and vice versa. In this respect, reference is made in full to the statements there regarding the more detailed characterization of the features.

BRIEF DESCRIPTION OF THE DRAWINGS

The solution presented herein and its technical environment are explained in further detail below with reference to the figures. It should be noted that the disclosure is not to be limited by the exemplary embodiments shown. In particular, unless explicitly shown otherwise, it is also possible to extract partial aspects of the facts explained in the figures and to combine them with other components and/or findings from other figures and/or the present description. The following is shown schematically.

DETAILED DESCRIPTION

Figure 1:
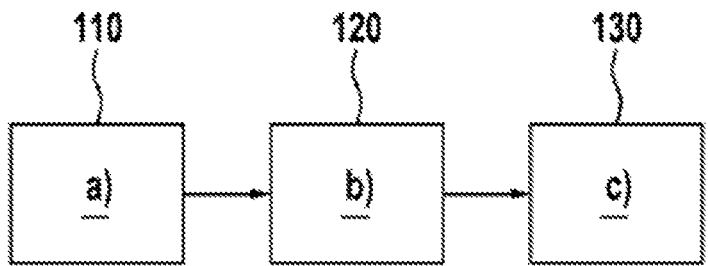
FIG. 1: an exemplary flow of a method described herein.

FIG. 1 schematically shows an exemplary flow of a method described herein. The method is used to provide information 1, 2 on the reliability of a parametric estimation of a parameter for the operation of a vehicle 3. The sequence of the method steps a), b) and c) shown with the blocks 110, 120 and 130 generally arises with a regular operating procedure. In particular, steps a) and b) may be performed at least in part in parallel or even simultaneously.

In block 110, according to step a), an integrity range 1 for the parametric estimation is identified, the integrity range 1 describing the range in which an estimated parameter is located with a minimum probability. In block 120, according to step b), a validity indicator 2 is identified which describes the validity of the integrity range 1 identified in step a). In block 130, according to step c), the integrity range 1 identified in step a) and the validity indicator 2 identified in step b) are provided.

Figure 2:
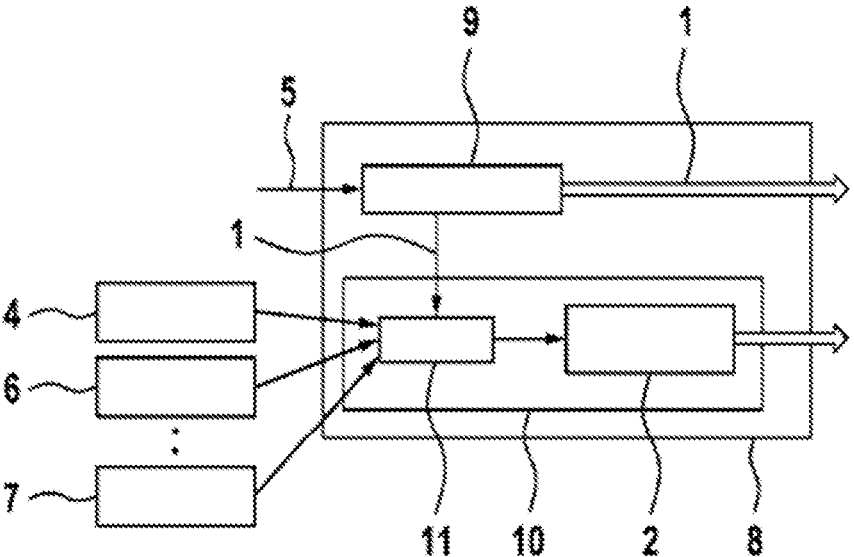
FIG. 2: an exemplary structure of the controller described herein.

FIG. 2 schematically shows an exemplary structure of the controller 8 described herein. The controller 8 is configured to perform the method described herein. The controller 8, by way of example, comprises an integrity module 9 for identifying the integrity range 1 (here a protection level) and a validity module 10 for identifying the validity indicator 2. The modules can in principle be implemented as physical components of the controller 8 or as parts of a computer program.

The integrity module 9 is, by way of example, configured to identify the integrity range 1 as a function of at least one piece of confidence information 5. The confidence information 5 may, for example, result from a Kalman filter estimation. In this context, the confidence information 5 may, for example, be provided in the form of or from a covariance matrix. The Kalman filter estimation may be based on sensor data from vehicle sensors. FIG. 2 thus also illustrates an example of the fact that and, where appropriate, how the integrity range 1 can be identified in step a) based on statistical confidence information 5 on the parametric estimation.

The validity module 10 is, by way of example, configured to identify the validity indicator as a function of in particular vehicle-side conditions or information and/or conditions or information external to the vehicle and/or information on the integrity range 1. For this purpose, the validity module 10, by way of example, comprises a combiner 11 with which various pieces of information, such as vehicle-side conditions or information and/or conditions or information external to the vehicle and/or information on the integrity range 1, are combined to form the validity indicator 2 or are (pre)processed and the processed information can subsequently be combined to form the validity indicator 2. The various pieces of information may, for example, comprise sensor data 4, at least one piece of environmental information 6 and/or at least one piece of status information 7. Of course, further information may also be considered. The information may be generated by sensors 12 (cf. FIG. 3) and/or the integrity module 9.

FIG. 2 thus also illustrates an example of the fact that and, where appropriate, how the validity indicator 2 can be identified using at least one piece of environmental information 6 on the environment of the vehicle 3. Furthermore, FIG. 2 thus also illustrates an example of the fact that and, where appropriate, how the validity indicator 2 can be identified using at least one piece of status information 7 on the status of the vehicle 3 or of a component thereof. Moreover, FIG. 2 thus also illustrates an example of the fact that and, where appropriate, how the validity indicator 2 can be identified using the integrity range 1 identified in step a).

Figure 3:
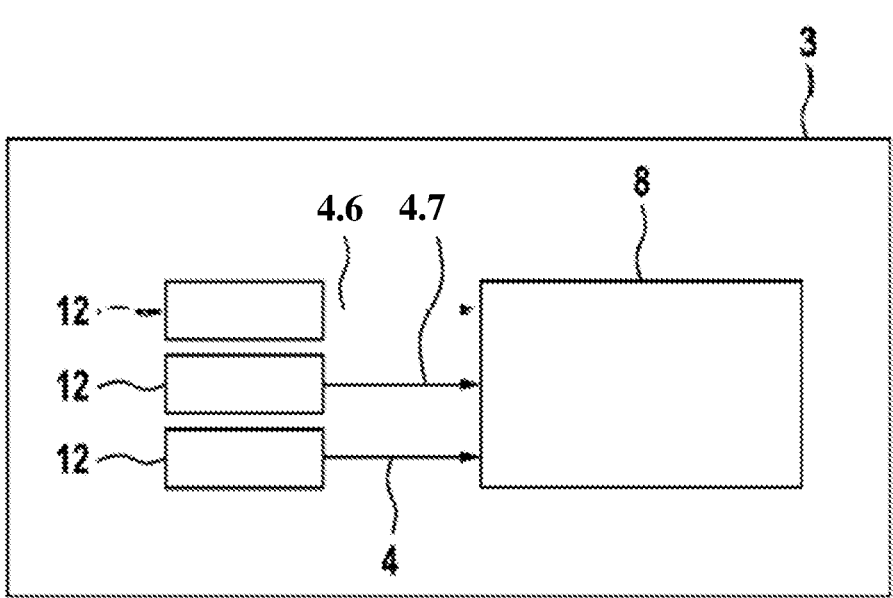
FIG. 3 an exemplary representation of a vehicle with the controller described herein.

FIG. 3 schematically shows an exemplary representation of a vehicle 3 with the controller 8 described herein. The vehicle 3 furthermore comprises, by way of example, a plurality of sensors 12, which can provide data or information to the controller 8. The information may, for example, be environmental information 6 on the surroundings of the vehicle 3 and/or status information 7 on the status of the vehicle 3. FIG. 3 thus also illustrates an example of the fact that and, where applicable, how the identification of the integrity range 1 according to step a) and/or the identification of the validity indicator 2 according to step b) can take place based on sensor data 4 of at least one sensor 12 of the vehicle 3. In particular, the validity indicator 2 may be provided as a value from a predetermined quantity of values.

The invention claimed is:

1. A method for providing information on a reliability of a parametric estimation of a parameter for an operation of a vehicle, comprising:

identifying a protection level for the parametric estimation of the parameter, the identified protection level describing a range in which the parametric estimation of the parameter is located with a minimum probability;

calculating, based on at least one condition of the vehicle, a validity indicator which describes a validity of the identified protection level, the identified validity indicator being a value from a predetermined quantity of values, the predetermined quantity of values including at least three different values;

providing the identified protection level and the identified validity indicator; and operating the vehicle depending on the parametric estimation of the parameter, the identified protection level, and the identified validity indicator, wherein the at least one condition the vehicle includes at least one of (i) a longitudinal or lateral acceleration of the vehicle being outside a defined limit, (ii) a failure of a system or sensor of the vehicle, (iii) a weather condition, and (iv) sensor shading of a sensor of the vehicle.

2. The method according to claim 1, wherein at least one of:

identifying the protection level comprises identifying the protection level based on sensor data of at least one sensor of the vehicle; and identifying the validity indicator comprises identifying the validity indicator based on the sensor data of the at least one sensor of the vehicle.

3. The method according to claim 1, wherein the protection level is identified based on statistical confidence information on the parametric estimation.

4. The method according to claim 1, wherein the identified validity indicator is identified using at least one piece of environmental information on an environment of the vehicle.

5. The method according to claim 1, wherein the identified validity indicator is identified using at least one piece of status information on the status of the vehicle or of a component thereof.

6. The method according to claim 1, wherein the identified validity indicator is identified using the identified protection level.

7. The method of claim 1 wherein a computer program is executed by a controller, to perform the method.

8. The method of claim 7 wherein the computer program is stored on a non-transitory machine-readable storage medium.

9. The method of claim 1 wherein a controller for the vehicle is configured to perform the method.

* * * * *